March 14, 1961  G. L. GARRISON  2,974,543
HYDROGEAR TRANSMISSION DEVICE
Filed May 1, 1957  3 Sheets-Sheet 1
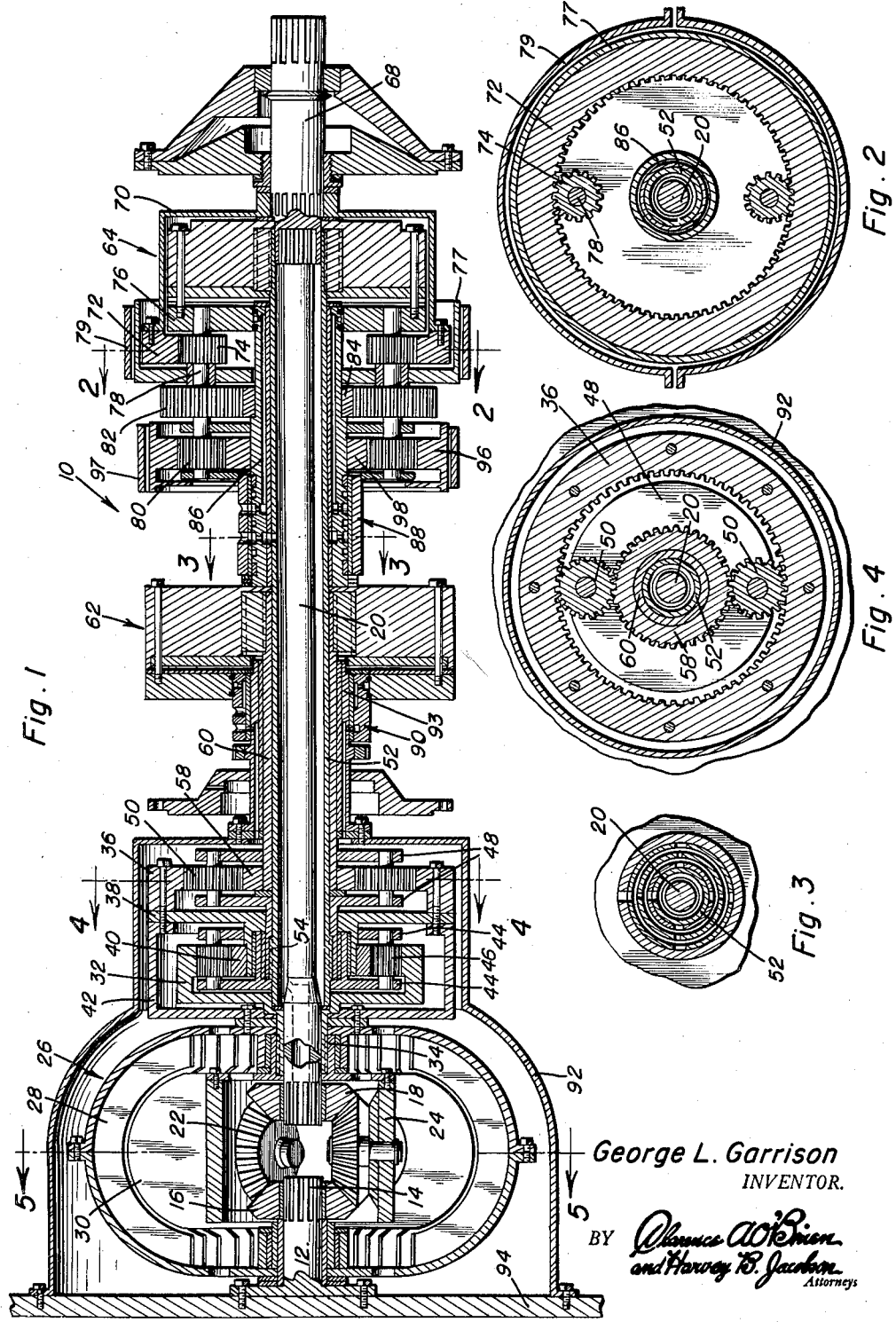
George L. Garrison
INVENTOR.

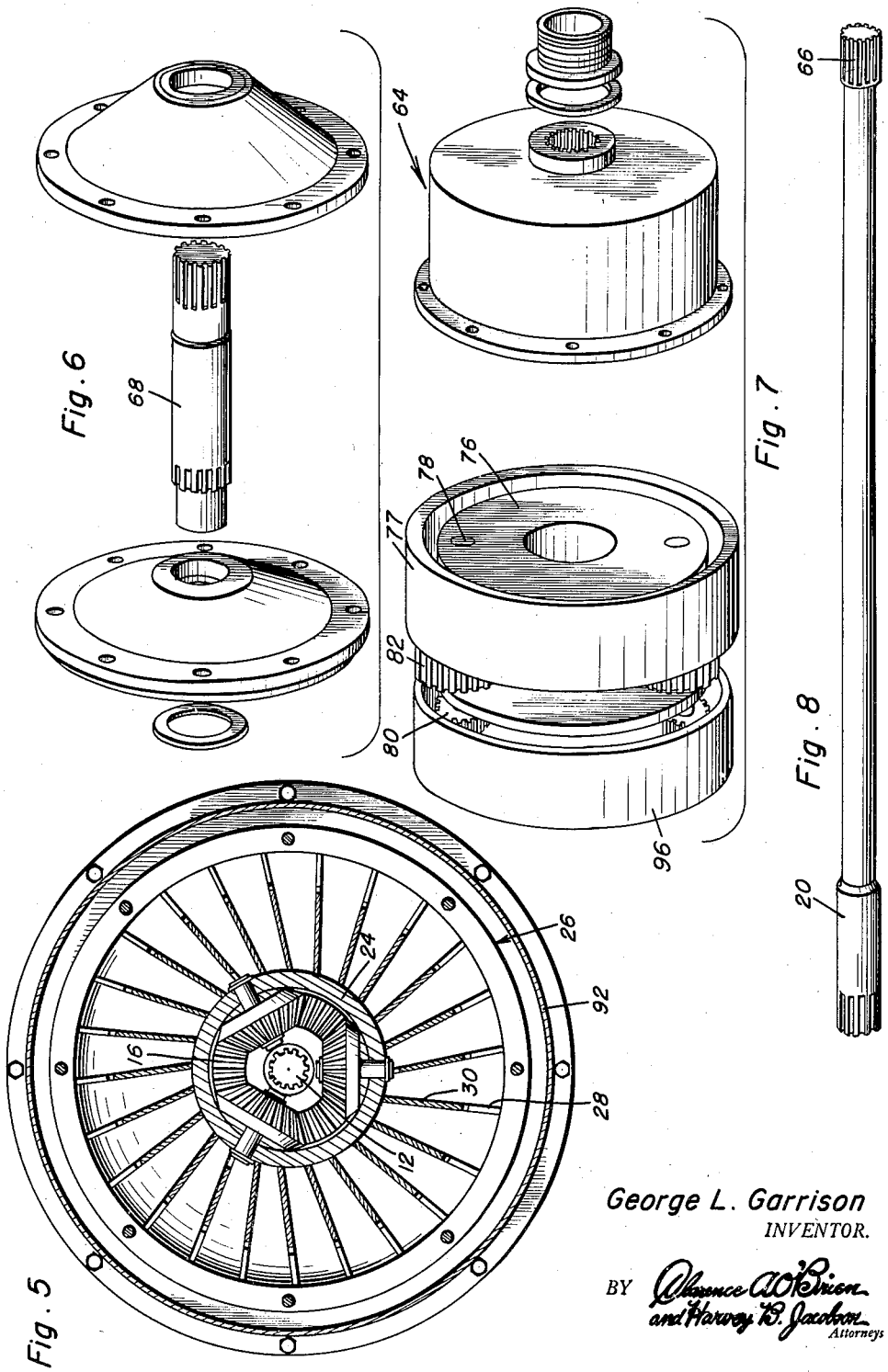

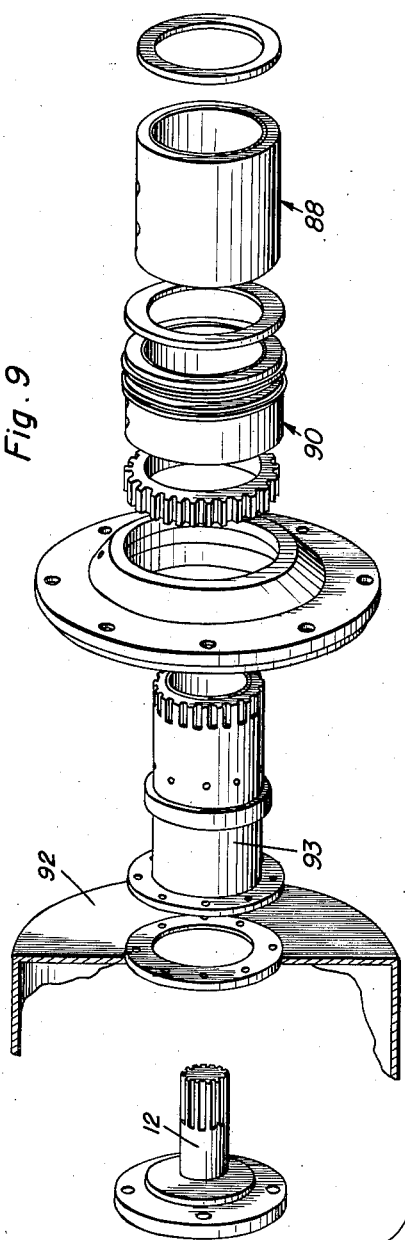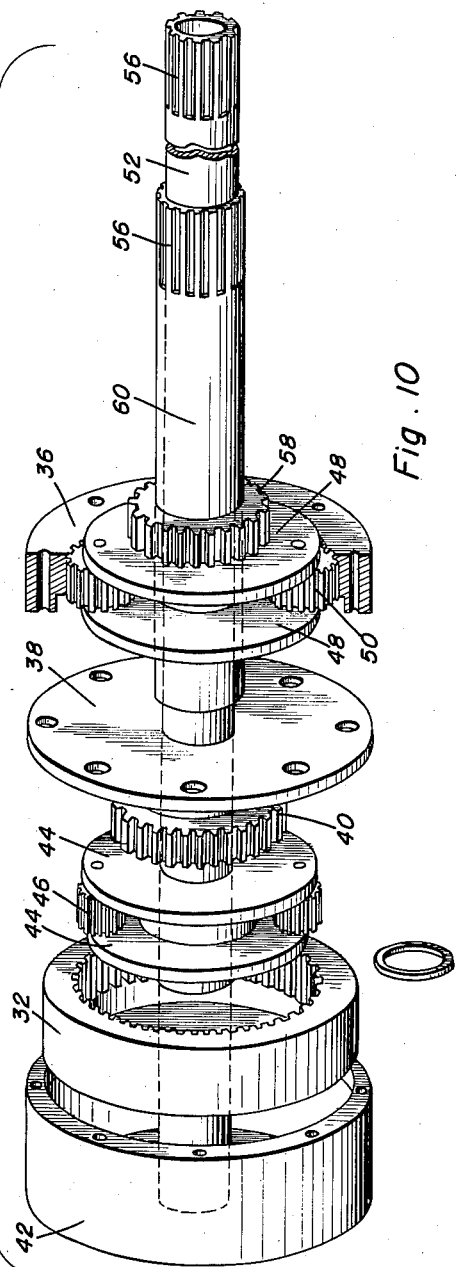

United States Patent Office 2,974,543
Patented Mar. 14, 1961

2,974,543

HYDROGEAR TRANSMISSION DEVICE

George L. Garrison, 119 Stuyvesant Ave., Kearny, N.J., assignor of fifty percent to Loretta C. Garrison, Kearny, N.J.

Filed May 1, 1957, Ser. No. 656,265

4 Claims. (Cl. 74—677)

This invention generally relates to a power transmission device and more particularly relates to a transmission for use in automobiles or similar vehicles in which it is desirable that a variable ratio of rotation exist between the power input shaft and the power output shaft as the speed of the input and output shafts increase.

An object of the present invention is to provide a transmission device having a four to one reduction ratio at zero r.p.m. with the reduction ratio reducing uniformly to a direct drive at substantially one-fourth of the operating r.p.m. of the power plant.

The hydrogear transmission of the present invention is a combination of a differential gear and a torque converter employing a pair of pinion gears interconnected by spider gears mounted in a cage with the annular impellers of the torque converter being mounted concentric therewith with the slippage between the impellers varying the ratio of the transmission device. One of the pinion gears of the differential arrangement is driven from the power plant with the other of the impellers being connected through planetary gear systems to a mechanism for driving a load. The necessary planetary gears and clutches are provided for controlling rotation of the output shaft.

These together with other objects and advantages which will become subsequently apparent reside in the details of construction and operation as more fully hereinafter described and claimed, reference being had to the accompanying drawings forming a part hereof, wherein like numerals refer to like parts, throughout, and in which:

Figure 1 is a longitudinal sectional view taken generally along a plane passing through the longitudinal center of the transmission device of the present invention with all extraneous housings, oil pumps, bearings and the like being omitted for the purpose of clarity;

Figure 2 is a transverse sectional view taken substantially upon a plane passing along section line 2—2 of Figure 1;

Figure 3 is a transverse sectional view taken substantially upon a plane passing along section line 3—3 of Figure 1;

Figure 4 is a transverse sectional view taken substantially upon a plane passing along section line 4—4 of Figure 1;

Figure 5 is a transverse sectional view taken substantially upon a plane passing along section line 5—5 of Figure 1;

Figure 6 is an exploded group perspective view of the final drive assembly;

Figure 7 is an exploded group perspective view of the rear planetary gear systems;

Figure 8 is a perspective view of the elongated main drive shaft;

Figure 9 is an exploded group perspective view of the central portion of the transmission device; and Figure 10 is an exploded group perspective view of the first and second planetary gear systems.

Referring now specifically to the drawings, the numeral 10 generally designates the hydrogear transmission device of the present invention. The transmission device 10 includes a power input shaft 12 having the inner end thereof splined as designated by numeral 14 with a drive pinion gear 16 mounted thereon. A driven pinion gear 18 is splined to an elongated driven shaft 20 in facing relation to the drive pinion 16. Intermeshed with the drive pinion 16 and the driven pinion 18 is a plurality of spider gears 22 rotatably supported from a spider gear cage 24. This construction is quite similar to a differential system employed in the rear end of a passenger automobile and will operate in substantially the same manner in which the cage 24 will either stand still at which time the spider gears 22 rotate very rapidly or rotate at the same speed as the pinion gears 16 and 18 with various intermediate stages of relative rotational movement of the cage 24.

Disposed in concentric or encircling relation to the differential assembly just described is provided a torque converter unit generally designated by numeral 26 which includes an outer impeller or vane carrying member 28 and an inner impeller or vane carrying member 30 each of which is generally annular in shape. The inner impeller 30 is connected directly to the spider 24 with the outer impeller 28 being connected with the load through planetary gearing systems as described hereinafter. The cage 24 is connected to a ring gear or internal gear 32 of a first planetary system by virtue of a splined connection between telescoping portions as designated by numeral 34. A ring gear or internal gear 36 of a second planetary system is connected rigidly with a plate 38 having the sun gear 40 rigid therewith. The plate 38 is also rigid with the outer impeller 28 by virtue of an interconnecting housing 42. The first planet carrier plates 44 of the front planetary system having the idler gears 46 journaled thereon are rigid with the planet carrier plates 48 of the second planetary system having the planet gears 50 journaled thereon whereby rotation of the planet carriers of the first and second planetary systems are rigid in relation to each other. The planet carrier plates 44 and 48 are also rigid with an elongated tubular shaft 52 by virtue of the splined connection 54. The tubular shaft 52 is also provided with a splined portion 56 at the rear end thereof. The second sun gear 58 is connected to a tubular shaft 60 splined to a front clutch assembly 62 while the tubular member 52 is splined to a rear clutch assembly generally designated by numeral 64.

The rear end of the elongated shaft 20 is provided with a splined connection 66 to the inner end of a final drive shaft 68 which is splined to a casing 70 connected with a second internal gear 72 of a rear planetary system having the planet gears 74 carried by the carrier plate 76 forming a portion of the clutch assembly 64 for selectively locking the planet carrier 76 in relation to the tubular shaft 52. The planet gears 74 are mounted on an elongated shaft 78 having planet gears 80 on the outer end thereof and slightly larger gears 82 centrally thereof with the gears 74 and 82 being one unit and with the larger gears 82 being disposed in meshing engagement with a sun gear 84 attached to a tubular sleeve 86 splined to the front clutch assembly 62 which is driven by casing 92 through sleeve 93 for driving front oil pumps and valve assembly generally designated by numeral 90 in sleeve 93, front clutch sleeve 86 having sun gears 98 and 84 thereon and a valve assembly feed 88 for rear clutch and torque converter. The outer part of assemblies 88 and 90 are held and supported in the transmission casing (not shown). The first and second planetary units constituting the front planetary system as well as the torque converter are enclosed by the housing 92 which is connected to the rotatable drive plate 94.

The front ring gear 96 of the rear planetary system is provided with a brake 97 which is employed as an emergency low gear and is in meshing engagement with the planet gears 80 on the forward ends of shafts 78 with the planet gears 80 being in meshing engagement with a front sun gear 98 on sleeve 86 which is splined to front clutch assembly 62. The shafts 78 may be locked for providing a reverse drive from the output shaft by the use of a brake 79 on a drum 77 on one of the carrier plates 76 thus providing a reverse gear. At this time the ring gear 96 is turning freely in reverse with ring gear 72 being driven in reverse thereby driving casing 70 and the final drive shaft 68 in reverse.

In operation of the transmission with the clutches 62 and 64 released and under no load, the input pinion gear 16 will turn one revolution and will turn the spider gears and its impeller 30 one-half of a revolution with the driven output pinion gear 18 being held by the load to be driven. In forward starting speed both clutches 62 and 64 are applied and load is applied to the input pinion gear, spider gear and torque converter. With proper slippage in the torque converter, there will be a gear reduction to the load to be driven. As r.p.m. of the torque converter increases, the slippage in the torque converter will decrease along with a reduction gear decrease driving the load to be driven and the driven pinion gear. As velocity of the load to be driven and the r.p.m. of the driven pinion gear increases, the r.p.m. of the spider gear impellers and torque converter will increase thereby making the driven pinion gear a secondary driving pinion gear, completing the second half of the revolution to the spider and cage. This cycle continues, taking an advantage, and using proper slippage in a torque converter for starting velocity of desired gear reduction and gear reduction decrease as load velocity increases to desired velocity for a one to one ratio. In forward starting speed both clutches are applied thereby turning the sun gear of the rear planetary unit and the rear sun gear of the front planetary unit one revolution. If the cage or carrier of the rear unit is held and the sun gear turns one revolution, the ring gear or internal gear will turn in reverse one-quarter of a revolution and if the sun gear is held and the planet carrier is turned, the ring gear will turn one and one-quarter revolutions so that if the planet carrier turns .4 of a turn the ring gear, which is the load to be driven, will turn one-quarter of a turn forward thereby turning the rear pinion gear one-quarter of a turn and turning the spider gear with the impellers and front ring gear of the front planetary gear unit one-half of one-quarter of a turn plus the one-half turn the carrier with impellers is driven by the power plant pinion gear thus turning .625 revolution. It follows that with the rear sun gear of the front planetary unit turning one turn and the front ring gear turning .625 revolution and the front carrier turning the carrier of a rear planetary unit .4 turn, the r.p.m. of the final drive will be .25 revolution with slippage in the impellers and no slippage in the final drive.

In the changing from starting speed of one to .25 to accelerating speed, the increasing velocity of the rear pinion gear will increase the velocity of the spider gear and cage. This will decrease the slippage of the impellers and the hydrogear will be in operation with the outer impellers turning the front sun gear of the front unit and the rear ring gear of the same unit through the train of gears turning the front cage and back to the cage of the rear planetary unit and turning the ring gear and load to be driven.

Front pinion gear 16 turns clockwise and for each revolution thereof and of the input shaft 12, the spider gear cake will be turned one-half of a revolution when the rear pinion is held by the load. When both clutches are applied, the rear sun gear of the rear planetary unit and the rear sun gear of the front planetary unit turn clockwise one revolution. The flow of power goes through housing to shaft, to pressure plate and clutch to hub of clutch and shaft running back to rear sun gear. The flow of power also goes through pinion gear shaft which turns one revolution to the front pinion gear 16 thus turning spider gear .625 revolution to the shaft leading to the front ring gear. With the front ring gear turning .625 revolution and driving front sun gear 40 of the front planetary unit and the sun gear 84 is driven by sleeve 86 which is driven from clutch housing 62 and turning the carrier plates 44 and 48 said shaft 52 is connected therewith and with clutch 64, the cage will turn .4 revolution with the rear ring gear, the front sun gear and the outer impellers being one unit of the hydrogear which will have maximum clockwise motion, which motion is slower than the motion of the spider gear and inner impellers 30, which slippage has to be overcome for driving load.

After a speed of 800 revolutions of the power plant is obtained, the hydrogear becomes the driver thus driving the front sun gear, rear ring gear of the front planetary system through carriers 44 and 48 and back to the clutch 64, with the rear pinion gear then forming a secondary driving pinion gear and driving the spider gear and impellers. As the velocity of the load, the revolution of the output shaft, the shaft back to the pinion, the revolution of spider gear increases, the gear reduction will decrease with a gradual reduction of the gear reduction to a one to one ratio at 1000 r.p.m. of the power plant. A one to one is reached at ¼ of input speed because slippage has been overcome at this point.

At starting speed a fixed gear reduction of 4 to 1 continues until the hydrogear starts to drive the load at 800 r.p.m. There is considerable slippage in the converter up to this point and as the impellers 30 start to overcome this slippage to impellers 28 the housing 42, the ring gear 36, sun gear 40, and they will drive cage 44 at a reduced gear reduction, thus driving the load. As the velocity of the load increases, the r.p.m. of the pinion gear 18 will increase. This will increase the r.p.m. of the impellers 30 and continue the cycle of above.

This is continued until a 1 to 1 ratio is reached. If a velocity of load to be driven at its maximum is 120 m.p.h. and 4000 r.p.m. of the power plant, then the load to be driven at a gear reduction will come out of that gear reduction at ¼ of the total input to the load (output of the power plant), 1000 r.p.m. of the power plant, which is ¼ of the maximum velocity, 30 m.p.h. At 1000 r.p.m. of the power plant and 30 m.p.h. of the load, the slippage in the converter has been overcome and the hydrogear turns as one unit, the same as in the differential gear of a passenger car when the two rear wheels, two pinion gears, spider gear and cage turn as one.

If slippage has been overcome in the converter at ¼ of the input r.p.m. to the hydrogear, with the power plant and front pinion gear 16 turning 1000 r.p.m., the cage 24, impellers 30, ring gear 32 will turn ½ of 1000 or 500 r.p.m., with the planetary carrier cage of the front planetary unit 44 and 48; the tubular shaft 52, clutch 64, and rear planetary carrier cage turning the first portion of the desired 1 to 1 ratio at 1000 r.p.m.

With this happening and the power plant turning bell housing 92, sleeve 93, clutch 62, shaft 60, sun gear 58, sleeve 86, sun gears 84 and 98, 1000 r.p.m.

With this happening carrier cages 44 and 48, shaft 52, clutch 64 and rear carrier cage 76 will turn ring gear 72, housing 70, final shaft 68, shaft 20, rear pinion gear 18, carrier cage of the spider gear 24, impellers 30 and 28 of torque converter 26, housing 42, ring gear 36, a sun gear 40, completing the second portion to a 1 to 1 ratio and direct drive. (Note: The rear pinion gear 18 is a secondary driving gear.)

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalens may be resorted to, falling within the scope of the invention as claimed.

What is claimed as new is as follows:

1. A transmission device comprising, a differential unit including operatively interengaged input element, output element and control element, a first planetary control unit including five operatively interengaged members, a first of said members being drivingly connected to the input element of the differential unit, a second of said members being connected to the control element, hydraulic drive means drivingly connecting said control element to the third and fourth of said members, the fifth of said members being an output member of the first planetary control unit and including first and second rigidly interconnected planet carriers and first and second planet gears carried thereby, the first planet gear drivingly interconnecting the second and fourth member, the second planet gear drivingly interconnecting the first and third member, a second planetary control unit including three operatvely interengaged elements, a first of said elements including a planet carrier being drivingly connected to said output member of the first planetary unit and first and second rigidly interconnected planet gears on the carrier, a second of said elements being connected to said first member of the first planetary unit and drivingly connected with the first of said planet gears of the second planetary unit, the third of said elements of the second planetary unit being connected to said output element of the differential unit and drivingly connected with the second of said planet gears of the second planetary unit to thereby provide a variable speed ratio between the input element and output element of the differential unit which is a function of slippage in the hydraulic drive means and load torque on the output element.

2. The transmission as defined in claim 1, wherein the first member of the first planetary unit is disconnectible from the input element of the differential unit while the output member of the first planetary unit is disconnectible from the first element of the secondary planetary unit.

3. The transmission as defined in claim 2, including brake means operatively connected to the first element of the second planetary unit engageable to provide a fixed ratio starting drive.

4. The transmission as defined in claim 3, including a reverse brake mechanism operatively connected to a fourth element, said fourth element being drivingly connected with a third planet gear rigidly interconnected with the first and second planet gears of the second planetary unit for providing a reverse drive ratio.

References Cited in the file of this patent

UNITED STATES PATENTS

| 2,354,597 | Jandasek | July 25, 1944 |
| 2,674,137 | Place | Apr. 6, 1954 |
| 2,772,583 | Harbaugh | Dec. 4, 1956 |

FOREIGN PATENTS

| 356,798 | Great Britain | Sept. 11, 1931 |
| 723,828 | Germany | Aug. 12, 1942 |